Figure 1:
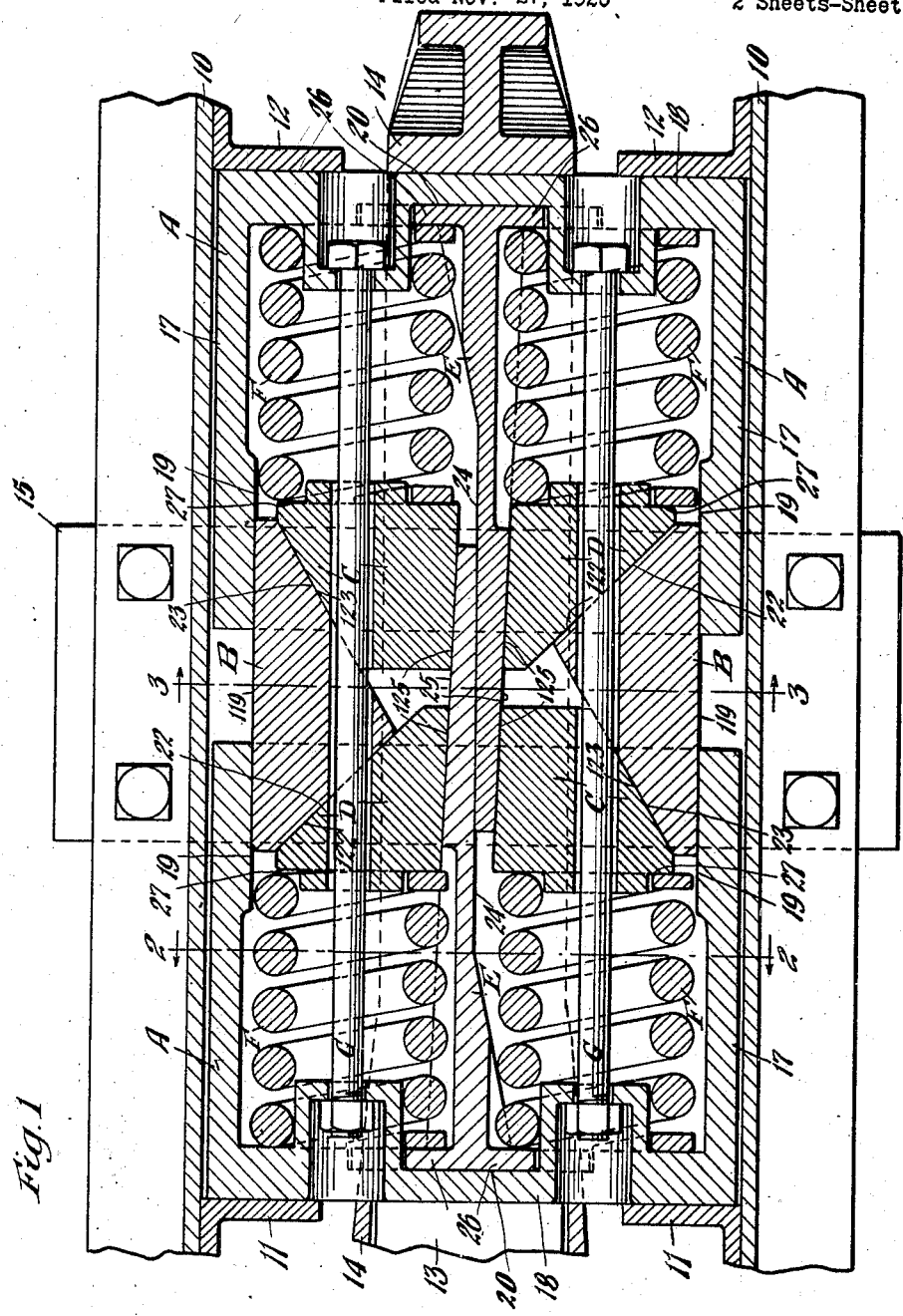

Aug. 30, 1927.  
J. F. O'CONNOR  
1,640,421  
FRICTION SHOCK ABSORBING MECHANISM  
Filed Nov. 27, 1925 2 Sheets-Sheet 1

Witness  
Wm. Geiger

Inventor  
John F. O'Connor  
By George I. Haight  
His Atty.

Aug. 30, 1927.
J. F. O'CONNOR
1,640,421
FRICTION SHOCK ABSORBING MECHANISM
Filed Nov. 27, 1925 2 Sheets-Sheet 2
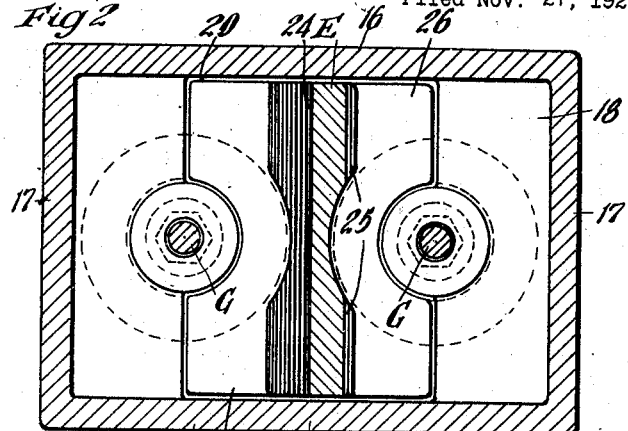
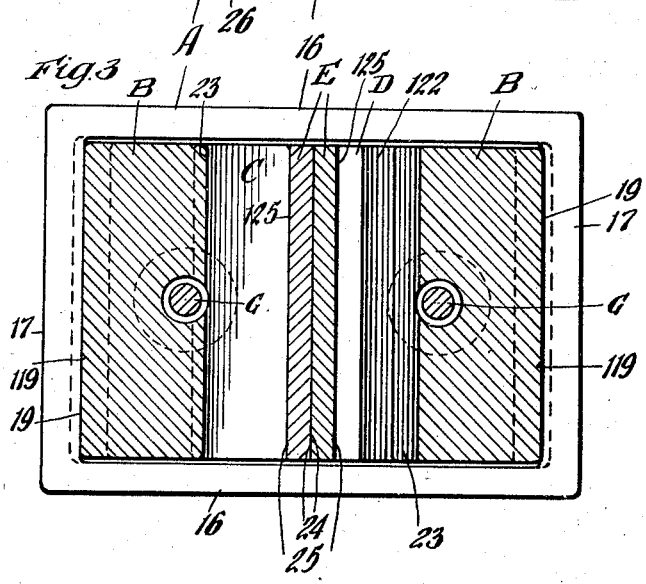
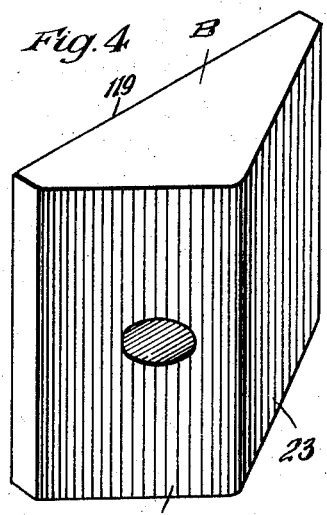
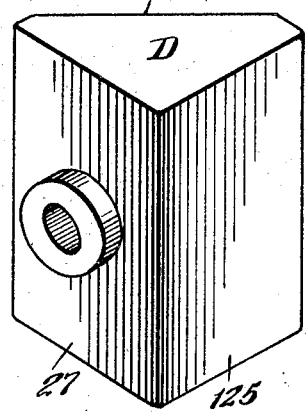
Witness
Wm. Geiger
Inventor
John F. O'Connor
By George I. Haight
His Atty.

Patented Aug. 30, 1927.

1,640,421

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 27, 1925. Serial No. 71,795.

This invention relates to improvements in friction shock absorbing mechanisms.

One object of this invention is to provide a friction shock absorbing mechanism, especially adapted for railway draft riggings, having high capacity and assured release, employing a plurality of relatively movable friction elements, including relatively movable friction posts having interengaging friction surfaces.

A further object of the invention is to provide a mechanism of the character indicated, including a pair of relatively movable follower casings having interior friction surfaces, friction shoes cooperating with the casings, friction elements having wedging engagement with the shoes and a friction post movable with each casing, having friction surfaces cooperating with the friction elements, wherein the posts overlap and have frictional engagement with each other and the cooperating friction surfaces of the posts and shoes are inclined to the longitudinal axis of the mechanism to produce a differential action.

Other advantages will more fully appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding, respectively, to the lines 2—2 and 3—3 of Figure 1. And Figures 4 and 5 are detailed perspective views of a friction shoe and a wedge block employed in connection with my improved shock absorbing mechanism.

In said drawings, 10—10 indicate the usual channel-shaped center or draft sills of a railway car underframe, to the inner faces of which are secured front stop lugs 11—11 and rear stop lugs 12—12. The inner end of the draw-bar is designated by 13, to which is operatively connected a hooded yoke 14, of well-known form. The shock absorbing mechanism proper, more fully hereinafter described, is disposed within the yoke, the yoke in turn being supported by a detachable saddle plate 15 secured to the draft sills.

The improved shock absorbing mechanism proper, as shown, comprises, broadly, front and rear friction shells A—A; two friction shoes B—B; a pair of wedge blocks C—C; a second pair of wedge blocks D—D; two friction posts E—E; front and rear sets of twin arranged spring resistance elements F—F and F—F; and a pair of retainer bolts G—G.

The front and rear friction shells A are of similar design, each being in the form of a substantially rectangular box-like casting having horizontally disposed, longitudinally extending top and bottom walls 16—16, vertically disposed, longitudinally extending spaced side walls 17—17 and a transverse end wall 18. The end walls 18 of the front and rear friction shells cooperate with the corresponding stop lugs on the draft sills in the manner of the usual main followers. The side walls 17 are provided with opposed interior friction surfaces 19—19 at the inner end thereof. Between the friction surfaces 19 and the end walls 18, the side walls 17 of the shells are cut away, as most clearly shown in Figure 1. The end wall 18 of each shell is cut away or recessed centrally on the inner side thereof to provide a seat 20 for the corresponding friction post E. The friction surfaces 19 of each shell are preferably disposed in parallel relation.

The friction wedge shoes B, which are two in number, are disposed at opposite sides of the mechanism. Each shoe has a flat outer friction surface 119 adapted to cooperate with the friction surfaces 19—19 of the front and rear friction shells A at the same side of the mechanism. On the inner side, each shoe B has a pair of wedge faces 22 and 23. The wedge face 22 of each shoe is disposed at relatively blunt releasing angle with reference to the longitudinal axis of the mechanism, while the face 23 is disposed at a relatively true wedge acting angle with reference to said axis. The shoes B at the opposite sides of the mechanism are reversely arranged so that the keen wedge face of one shoe and the blunt wedge face of the other shoe are disposed at the same end of the mechanism.

The friction posts E, which are two in number, are of identical design, one post being associated with each friction shell A. Each post E has a longitudinally disposed friction surface 24 on the inner side thereof and a longitudinally disposed friction surface 25 on the outer side thereof, the friction surface 24 of each post being parallel to the longitudinal axis of the mechanism and the friction surface 25 being slightly inclined with reference to said axis. As most clearly shown in Figure 1, the posts E associated with the front and rear friction shells, respectively, overlap to a considerable extent and the friction surfaces 24 thereof interengage. The friction surface 24 of each post is of such a length as to permit a full compression stroke of the mechanism. The outer friction surfaces 25 of the two posts, which, as hereinbefore described, are inclined with reference to the longitudinal axis of the mechanism, are preferably disposed in parallel relation. As shown in Figure 1, the friction surface 25 of the post E associated with the front friction shell A, is inclined forwardly, while the corresponding surface 25 of the post E associated with the rear friction shell A, is inclined rearwardly of the mechanism. At the outer end, each post is provided with a pair of laterally projecting flanges 26—26 adapted to be accommodated within the seat 20 of the corresponding friction shell A. The flanges 26 are of such a thickness that their inner faces lie flush with the inner surface of the corresponding end wall of the casing A. As most clearly shown in Figure 2, the longitudinal friction surfaces 25 of the posts are centrally cut away to accommodate the inner sides of the twin arranged spring resistance elements F.

The friction wedge blocks, which are four in number, comprise two pairs C—C and D—D, the same being arranged in front and rear sets, each comprising one block C and one block D. All of the blocks C and D are of the same design, except as hereinafter pointed out. Each wedge block has a flat transverse end face 27 forming an abutment for the outer end of the corresponding spring resistance element F. Each wedge block also has a flat, longitudinally disposed, inner friction surface 125 adapted to cooperate with the friction surface 25 of one of the posts E, and an outer wedge face adapted to cooperate with one of the wedge faces of the shoe B at the same side of the mechanism. The wedge faces of the blocks C are designated by 123, while the wedge faces of the blocks D are designated by 122. The wedge face 123 of each block C is correspondingly inclined to and adapted to cooperate with the keen wedge face 23 of one of the shoes B and the wedge face 122 of each block D is correspondingly inclined to and adapted to cooperate with the blunt wedge face 22 of the corresponding shoe B. Upon reference to Figure 1, it will be seen that the wedge blocks C and D at the one side of the mechanism, cooperate with the front friction post E while the wedge blocks C and D at the opposite side of the mechanism cooperate with the rear friction post E.

The spring resistance elements F, which are four in number, comprise front and rear sets of twin arranged springs. Each unit of the twin set has the outer end thereof bearing on the end wall of the corresponding friction shell and the inner end bearing on one of the friction blocks. The outer end of each spring element F also bears on the flange 26 at the corresponding side of the friction post E associated with the friction shell to hold the friction post seated and assure its return to normal position with the friction shell during release of the mechanism.

The mechanism is held of overall uniform length and in assembled relation by a pair of retainer bolts G. As most clearly shown in Figures 1, 2 and 3, the retainer bolts G are disposed in horizontal alignment on opposite sides of the mechanism and have their front and rear ends anchored, respectively, in hollow bosses on the end walls 18 of the front and rear friction shells. The shanks of the bolts are accommodated within longitudinally extending, aligned openings in the wedge blocks C and D and the friction shoe B at the same side of the mechanism. The retainer bolts in addition to holding the parts assembled, also serve to maintain the mechanism under a predetermined initial compression. Compensation for wear of the various friction and wedge faces is had by the expansive action of the spring resistance elements F, which, as hereinbefore pointed out, are under initial compression when the mechanism is assembled. To permit the necessary relative movement to compensate for wear of the various friction and wedge faces, clearance is left between the inner ends of the wedge blocks C and D.

The operation of my improved shock absorbing mechanism is as follows, assuming the compression stroke: The front and rear friction shells will be moved relatively toward each other, compressing the springs F and forcing the wedge blocks inwardly toward each other longitudinally of the mechanism, thereby setting up a wedging action between the keen angle wedge blocks C and the friction shoes B, and forcing the wedge blocks and friction shoes against the posts and the friction surfaces of the shells, respectively. During the continued relative movement of the front and rear friction shells A, the same will be moved relatively to the friction shoes and the friction posts E will be moved relatively to each other longitudinally of the mechanism. Friction will thus be created between the friction posts in addition to the friction created between the wedge friction shoes and the friction shells. Due to the inclination of the friction surfaces 25 of the posts E, the wedge blocks C and D at each side of the mechanism will be forced laterally outwardly during relative approach of the posts and friction shells, thereby effecting a differential action. Due to this differential action, the friction wedge system, including the wedge blocks C and D, will be elongated longitudinally of the mechanism, thereby effecting further compression of the spring resistance elements F. The described action will continue either until the actuating force is reduced or the inner ends of the shells come into abutment, whereupon the pressure will be transmitted directly through the shells, which act as column load transmitting means to transmit the force to the corresponding stop lugs of the draft sills. When the actuating force is reduced, the spring resistance elements F will restore the friction shells A to normal position and also center the friction wedge system with reference to the posts. Inasmuch as the coils of the spring resistance elements bear on the flanges of the friction posts, the latter will be carried outwardly with the shells during release. As will be evident, the shells will be slightly expanded during the compression of the mechanism, thereby setting up forces therein tending to contract the same when the actuating pressure is reduced. Due to the relatively blunt cooperating faces on the wedge blocks D and the friction shoes B, the wedge blocks will be squeezed out from between the shoes during the contraction of the shells, thereby relieving the pressure on the cooperating keen wedge faces of the wedge blocks and shoes, greatly facilitating the releasing operation. It will also be evident that the blunt wedge faces will act as "safety valves" to prevent undue strain being put on the friction shells, and will also accommodate the differential action due to the inclination of the friction surfaces of the friction posts E.

Although I have herein shown and described the wedge blocks and friction shoes of my improved mechanism, as provided with blunt and keen wedge faces, it will be evident that it is within the scope of my invention to dispose all of the wedge faces at the same angle with reference to the longitudinal axis of the mechanism.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with front and rear follower casings having interior friction surfaces, said casings being relatively movable toward and away from each other; of a friction post movable with each follower casing, said posts having inter-engaging friction surfaces; a plurality of friction elements cooperating with said posts; a plurality of lateral, wedge pressure creating members engaging said friction elements, each of said members having frictional contact with friction surfaces of both the front and rear casings; and spring resistance means interposed between each follower and the friction elements.

2. In a friction shock absorbing mechanism, the combination with front and rear follower members relatively movable toward and away from each other; of a friction post movable with each follower, said posts having inter-engaging friction surfaces, said posts also having additional friction surfaces inclined with respect to the longitudinal axis of the mechanism; friction means, including a plurality of friction elements cooperating with each post and means for wedging the said elements against said posts; and spring resistance means cooperating with the elements of each post.

3. In a friction shock absorbing mechanism, the combination with front and rear follower shells having interior, longitudinally disposed friction surfaces, said shells being relatively movable toward and away from each other; of a friction post movable with each shell, said posts having cooperating friction surfaces disposed longitudinally of the mechanism; a plurality of friction elements having frictional contact with each post; a plurality of friction shoes having wedging engagement with the friction elements, each shoe cooperating with friction surfaces of both shells; and spring resistance means opposing relative movement of said elements and shells.

4. In a friction shock absorbing mechanism, the combination with front and rear follower shells having interior friction surfaces, said shells being relatively movable toward and away from each other; of a friction post movable with each shell, said posts having cooperating friction surfaces on the inner sides thereof and each post having friction surfaces on the outer side thereof, the outer friction surfaces of said posts being disposed in parallel relation and inclined with respect to the axis of the mechanism; front and rear sets of friction elements cooperating with the outer friction surfaces of said posts; spring resistance means interposed between said elements and said shells; and a plurality of friction shoes, each shoe having wedging engagement with one of the friction elements of said front set and one of the friction elements of said rear set, each of said shoes also having frictional engagement with the front and rear follower shells.

5. In a friction shock absorbing mechanism, the combination with front and rear relatively movable follower shells; of a friction post movable with each follower shell; a set of front and rear friction elements cooperating with each post; a plurality of friction shoes, said shoes and follower shells having cooperating friction surfaces, and each of said shoes having wedging engagement with one of the said sets of friction elements; and means for yieldingly resisting relative movement of said shells and friction elements.

6. In a friction shock absorbing mechanism, the combination with front and rear relatively movable followers; of a post movable with each follower; sets of front and rear friction elements engaging each post; inwardly acting lateral wedge pressure creating means cooperating with said front and rear friction elements, and means for yieldingly resisting relative movement of said followers and friction elements.

7. In a friction shock absorbing mechanism, the combination with front and rear relatively movable follower shells; of a friction post movable with each shell; a set of front and rear friction elements cooperating with each post; a plurality of friction shoes, said shoes and follower shells having cooperating friction surfaces and said shoes and elements having sets of cooperating wedge faces, certain of said sets of faces being disposed at a relatively keen wedge acting angle with respect to the longitudinal axis of the mechanism and the remainder of said co-operating sets being disposed at a relatively blunt releasing angle with respect to said axis; and means for yieldingly resisting relative movement of said follower shells and friction elements.

8. In a friction shock absorbing mechanism, the combination with front and rear relatively movable shells, having interior, longitudinally disposed friction surfaces; of front and rear spring resistance elements; a friction post movable with each shell, said posts having inter-engaging, longitudinally disposed friction surfaces; and friction means at opposite sides of the mechanism cooperating with said shells and posts, friction means at one side of the mechanism frictionally engaging one of said posts and also frictionally engaging both follower shells, and the friction means at the other side of the mechanism frictionally engaging the other post and also frictionally engaging both follower shells, said friction means being interposed between said front and rear spring resistance elements, each means including a plurality of friction elements having cooperating wedge faces.

9. In a friction shock absorbing mechanism, the combination with front and rear, relatively movable shells having longitudinally disposed interior friction surfaces; of front and rear friction posts relatively movable toward each other upon relative movement of said shells, said posts having inter-engaging friction surfaces; a plurality of friction elements, certain of said elements having friction surfaces cooperating with friction surfaces of both shells, and having wedging engagement with the remaining elements, said last named elements comprising two sets, each set including front and rear members cooperating with one of the friction posts; and yielding means for resisting relative movement of said elements and shells.

10. In a friction shock absorbing mechanism, the combination with front and rear followers having longitudinally disposed friction surfaces, said followers being relatively movable toward and away from each other; of front and rear friction elements movable with said followers, said elements having co-operating friction surfaces; a friction system, cooperating with said elements, said system including a pair of friction shoes and two sets of front and rear friction members, each set having wedging engagement with one of the shoes, each set of friction members co-operating with one of said friction elements; and spring means interposed between each follower and the friction system.

11. In a friction shock absorbing mechanism, the combination with front and rear follower shells, each shell having a pair of opposed, longitudinally extending friction surfaces, said shells being movable toward and away from each other; of a pair of friction shoes disposed at opposite sides of the mechanism, each shoe having a friction surface cooperating with the friction surfaces of both shells at the same side of the mechanism, each shoe also having front and rear wedge faces; front and rear friction posts, said posts having longitudinally disposed, co-operating friction surfaces, said posts being movable respectively with said follower shells; a pair of wedge friction members co-operating with each post, said members being disposed at the same side of said post, said wedge friction members of each post having wedging engagement with the shoe at the same side of the mechanism; and spring means for opposing relative movement of said wedge friction members and posts and also opposing relative movement of said follower shells.

In witness that I claim the foregoing I have hereunto subscribed my name this 25th day of November, 1925.

JOHN F. O'CONNOR.